Dec. 2, 1930.   LE ROY ASKAM   1,783,270
WINDSHIELD CLARIFIER
Filed April 2, 1929
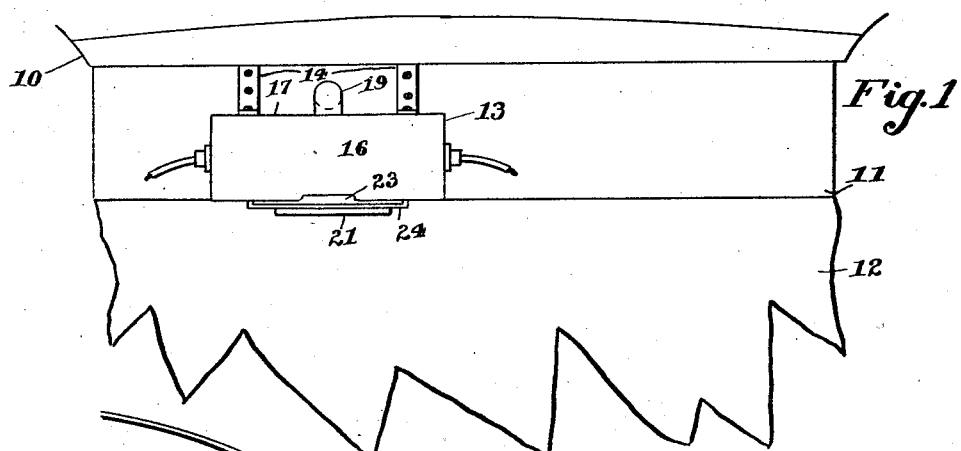
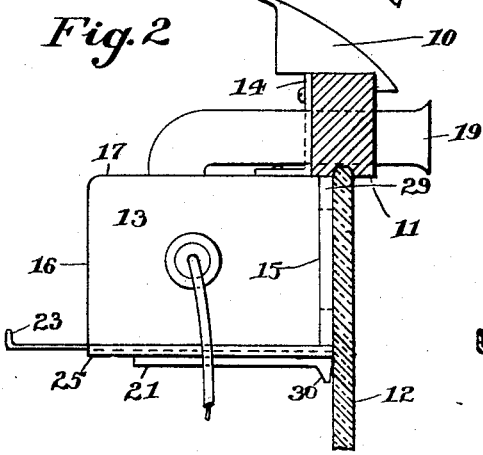
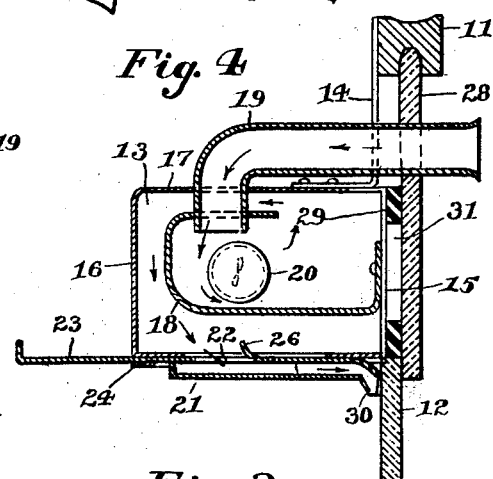
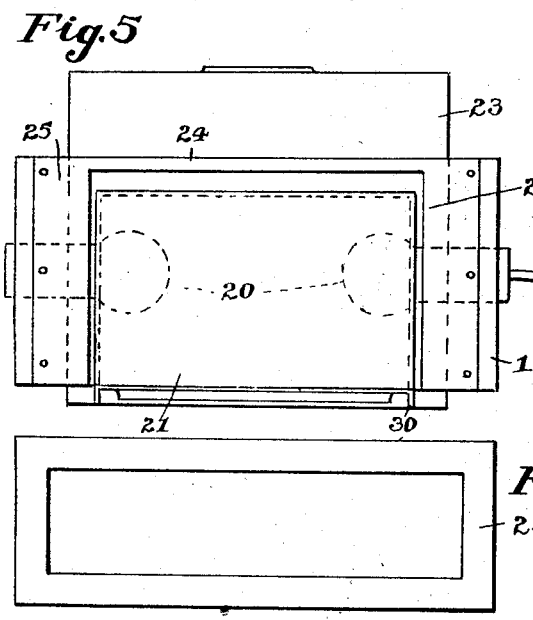
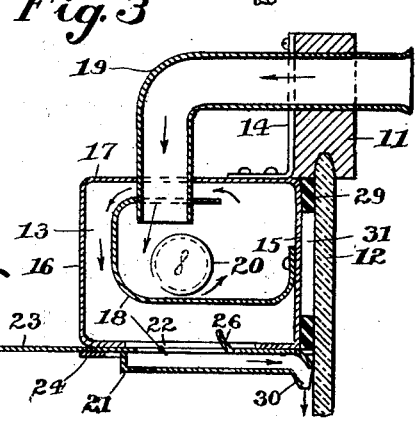
INVENTOR.
LeRoy Askam
BY
Chamberlain & Newman
ATTORNEYS.

Patented Dec. 2, 1930

1,783,270

UNITED STATES PATENT OFFICE

LE ROY ASKAM, OF MILFORD, CONNECTICUT

WINDSHIELD CLARIFIER

Application filed April 2, 1929. Serial No. 351,877.

This invention relates to new and useful improvements in windshield clarifiers of the class shown and described in my pending application for patent filed in the U. S. Patent Office March 1, 1928, bearing Serial No. 258,181 and in which application provision is made for taking cold air from outside of a car body, preferably in front of the windshield, and conveying it to a heating chamber and then discharging it against the inside of the glass windshield in a manner to heat the same sufficient to melt and remove any accumulation of snow or ice which may be formed upon the outside, and to further prevent the freezing of water thereon.

The present invention is adapted to most any form of clarifier wherein fresh air is forced into a heating chamber, warmed and then discharged against the glass windshield, and more particularly resides in providing an adjustable warm air conduit from the said heating chamber to the glass, so as to be better adapted to the various windshield structures and more particularly so that the heating unit may be supported, if desired, upon the frame of the windshield and yet discharge the flow of warm air against the glass in the line of vision of the operator.

My invention is also adapted to be applied to windshields made up of two pieces of glass, one overlapping the other and wherein the heating unit may, if desired, be supported against the inside of the upper member and yet have its stream of warm air projected against the lower section of glass whether positioned forward or rearward of the upper glass.

A further object of the invention is to include in a windshield clarifier of this class, means for providing an air pocket upon the forward side of the casing of the heating chamber so that when applied to the glass the air in the pocket may be warmed from the heating chamber, the heat utilized to warm the upper portion of the glass above where the stream of hot air is discharged, and so as to warm the snow and ice thereon and permit it to run down over the lower section so that the same will be more readily and effectively cleaned. In other words form a preliminary warming and loosening of the ice upon the front of the glass forward of the warm air spray.

The invention readily adapts itself to be mounted upon different constructions of windshields and by means of the adjustability of its warm air conduit it may be properly positioned next adjacent to the inside of the windshield in a manner to insure the most effective heating of the latter.

Additional objects and advantages will be apparent from a consideration of the following description taken in connection with the accompanying drawing wherein I have shown one embodiment of the invention. This disclosure is for the purpose of teaching the invention and reference must therefore be had to the annexed claims for a definition of the limitations of the invention since various modifications will readily suggest themselves.

In the drawing:

Fig. 1 is a fragmentary view of the inner front portion of an automobile looking from the interior thereof and showing the clarifier applied;

Fig. 2 is a sectional end view looking from the right in Fig. 1;

Fig. 3 is a cross sectional view of the invention shown in Figs. 1 and 2;

Fig. 4 is a transverse sectional view of the invention applied to a slightly different form of windshield;

Fig. 5 is a bottom plan view of the device detached; and

Fig. 6 is a front view of the gasket used in forming the dead air space.

Referring in detail to the drawing, and particularly to Figs. 1 and 2 thereof, at 10 is shown the forward portion of an automobile top, abutting which is the upper cross frame 11 of a windshield frame, the glass 12 being let into the frame as shown or mounted in any other suitable manner.

My improved clarifier comprises a casing 13 adapted to be secured to the frame 11 by a bracket 14. This casing includes side walls 15 and 16, a top 17 having an opening for a purpose to be described, and is open on its underside. Secured to the wall 15 and extending longitudinally of the casing is a deflector 18. The deflector is spaced from the top, side 16 and bottom of the casing as shown.

Extending through the frame 11 is an air inlet tube 19 open at its forward end outside of the car and extending within the car and into the casing 13. The inner end of tube 19 extends through the upper part of the coiled sheet of metal forming the deflector 18. Obviously as the car moves along air will enter tube 19 and be discharged within the deflector. For the purpose of heating or warming this air, lamps 20 are shown, although any other form of heating elements might be used, one being supported by each end wall of casing 13, the elements projecting into deflector 18.

Mounted in the open bottom of casing 13 is an adjustable air outlet passage or conduit 21 having an inlet opening 22 to receive air from the inside of the casing. At its rear the conduit is provided with an extension or finger piece 23 operating between casing 13 and a supporting strip 24. At its side edges the conduit 21 operates in and is supported by guides 25. Rearward movement of conduit 21 is limited by strip 24 while forward movement is limited by the glass 12 when the device is in operative position and by lip or projection 26 when the device is not associated with a windshield.

In Fig. 4, the casing 13 is supported by a somewhat different form of bracket 14 which may be applied to the car in any suitable manner best adapted to the construction of the same and its windshield. The windshield here illustrated in part includes two pieces of glass, the edge portions of which overlap, thus requiring a different positioning of the conduit therewith in relation to the casing. The casing with its attached gasket here shown are set against the upper glass 28 of the windshield while the nozzle end of the conduit 21 is positioned against the lower glass 12, the latter being shown inside of the outer glass.

A suitable shaped gasket 29 having an opening 31 therethrough is secured to the said side of casing 13 to engage the windshield glass as shown and when positioned against the glass 12 serves to form a closed pocket, the air in which is adapted to be heated through the front wall of the casing from the heating elements within the casing and for the purpose of heating the windshield glass. This gasket, which may be made of felt, further serves as a cushion between the clarifier and glass and thus prevents rattling.

With the movement of the car air enters tube 19 and is conveyed to the heating chamber preferably within the deflector 18, thus moving along the course indicated by the arrows, during which time it becomes heated and then passes on out through the opening 22 on the opposite side of the casing from which the air entered and into the conduit 21. The forward end portion of this conduit 21 includes a downwardly forwardly inclined portion forming a discharge nozzle 30 to direct the heated air downward over the inside of the windshield glass.

The space enclosed by the glass, casing and gasket forms a dead air pocket. This air in the pocket is heated by the heat which might be dissipated through wall 15, and in this way heat which would ordinarily be lost is utilized to heat the glass and thus prevent the glass being coated with snow or ice.

Having thus described my invention, what I claim and desire to secure by Letters Patent is:

1. In combination, a windshield glass, a casing, a gasket having an opening therein intermediate said glass and a wall of said casing to provide a warm air pocket, a heating means within the casing, means to direct air into said casing, and means to conduct the air from the casing and direct it against the glass below the warm air pocket.

2. In combination, a windshield glass, a casing, a heating means within the casing, a warm air pocket formed next adjacent to one wall of the casing and intermediate of it and the windshield glass in a way to heat the latter through the medium of the casing and its heating means.

3. In a windshield clarifier, a casing forming an air chamber, a heating unit within the casing, said casing having air inlet and outlet openings, an air conduit slidably mounted upon one side of and with respect to the casing adapted at all times to be in communication with said air outlet opening and having an outlet nozzle which may be positioned forward or rearward of the side of the casing.

4. In a windshield clarifier, a casing, a partition within said casing and forming two chambers with an air passage from one to the other, a heating unit in one of said chambers, an inlet conduit projected from the casing and extended into the chamber having the heating unit, an air outlet in the other of said chambers, and a conduit slidably mounted on the side of the casing for receiving the air from said outlet and discharging it against a windshield, said conduit being adjustable to dispose its discharge end in different positions relative to the windshield.

5. In a windshield clarifier, an elongated casing having a front wall adapted to be disposed toward a windshield, means for directing air into said casing, a heating means in said casing, said casing having an elongated discharge opening in its lower side, an air conduit slidably mounted against said lower side and having an elongated opening receiving air from the discharge opening, said air conduit having a discharge nozzle at its forward end, and said conduit mounted on guides at the underside of the casing whereby the conduit may be adjusted to position its discharge nozzle in various positions relative to the front wall of the casing.

Signed at Milford in the county of New Haven and State of Connecticut this 2nd day of Feb. A. D. 1929.

LE ROY ASKAM.